(12) United States Patent
Esterberg et al.

(10) Patent No.: US 10,800,176 B2
(45) Date of Patent: Oct. 13, 2020

(54) COLLAPSIBLE CONTAINER AND SENSOR

(71) Applicant: Hewlett-Packard Development Company, L.P., Spring, TX (US)

(72) Inventors: Dennis R Esterberg, Corvallis, OR (US); Matthew J Janssen, Corvallis, OR (US); Jeffrey A Nielsen, Corvallis, OR (US); Norman L Berger, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/661,802

(22) Filed: Oct. 23, 2019

(65) Prior Publication Data
US 2020/0055317 A1    Feb. 20, 2020

Related U.S. Application Data

(63) Continuation of application No. 15/765,256, filed as application No. PCT/US2015/065357 on Dec. 11, 2015, now Pat. No. 10,471,725.

(51) Int. Cl.
*B41J 2/175* (2006.01)
*B41J 29/38* (2006.01)
*G01B 7/14* (2006.01)

(52) U.S. Cl.
CPC .......... *B41J 2/17513* (2013.01); *B41J 2/175* (2013.01); *B41J 2/1752* (2013.01);
(Continued)

(58) Field of Classification Search
CPC ...... B41J 2/175; B41J 2/17513; B41J 2/1752; B41J 2/17553; B41J 2/17566; B41J 29/38;
(Continued)

(56) References Cited

U.S. PATENT DOCUMENTS 5,088,077 A    2/1992   Lemoine
5,635,962 A    6/1997   Goldis
(Continued)

FOREIGN PATENT DOCUMENTS

CN    1203358    12/1998
CN    1532063    9/2004
(Continued)

OTHER PUBLICATIONS

Level Measurement Product Overview for Applications in Liquids and Bulk Solids, Internet Nov. 24, 2015; URL: <<https://www.google.co.in/url?sa=t&rct=j&q=&esrc=.

*Primary Examiner* — Anh T Vo
(74) *Attorney, Agent, or Firm* — Rathe Lindenbaum LLP (57) ABSTRACT

An example printhead assembly includes a housing, nozzles and a collapsible container within the housing to supply ink to the nozzles. The collapsible container includes a top wall, a bottom wall, first and second side walls that form an interior and a spring assembly within the interior. The first flexible wall includes a first amount of excess material. The second flexible wall includes a second amount of excess material less than the first amount of excess material such that motion of the first flexible wall of the collapsible container is constrained against movement to a lesser extent as compared to the second flexible wall. The first flexible wall faces the sensor. A sensor assembly is coupled to the housing and includes a sensor to provide a sensor signal indicating the amount of ink within the collapsible container.

20 Claims, 6 Drawing Sheets

(52) U.S. Cl.
CPC ....... *B41J 2/17553* (2013.01); *B41J 2/17566* (2013.01); *B41J 29/38* (2013.01); *G01B 7/14* (2013.01); *B41J 2002/17516* (2013.01); *B41J 2002/17579* (2013.01); *B41J 2002/17586* (2013.01)

(58) Field of Classification Search
CPC .... B41J 2002/17516; B41J 2002/17579; B41J 2002/1786; G01B 7/14
See application file for complete search history.

(56) References Cited

U.S. PATENT DOCUMENTS

| | | | |
|---|---|---|---|
| 5,745,137 | A | 4/1998 | Scheffelin et al. |
| 5,757,406 | A | 5/1998 | Kaplinsky |
| 5,953,030 | A * | 9/1999 | Ishinaga ............... B41J 2/17513 347/86 |
| 6,010,212 | A * | 1/2000 | Yamashita ........... B41J 2/17513 347/86 |
| 6,270,207 | B1 * | 8/2001 | Sasaki .................. B41J 2/17513 347/86 |
| 6,339,335 | B1 | 1/2002 | Froger et al. |
| 6,386,693 | B1 | 5/2002 | Michele et al. |
| 6,414,894 | B2 | 7/2002 | Ooishi |
| 6,520,630 | B1 * | 2/2003 | Oda ..................... B41J 2/17503 347/85 |
| 7,922,274 | B2 | 4/2011 | Kubota et al. |
| 8,523,339 | B2 | 9/2013 | Tokuno |
| 10,471,725 | B2 * | 11/2019 | Esterberg ............. B41J 2/17553 |
| 2004/0027432 | A1 | 2/2004 | Childers |
| 2004/0252146 | A1 | 12/2004 | Naka et al. |
| 2007/0008365 | A1 | 1/2007 | Lee et al. |
| 2008/0143345 | A1 | 6/2008 | Boudaoud et al. |
| 2009/0303299 | A1 | 12/2009 | Gilson et al. |
| 2011/0205315 | A1 | 8/2011 | Saga |

FOREIGN PATENT DOCUMENTS

| | | |
|---|---|---|
| CN | 102036828 | 4/2011 |
| CN | 102161273 | 8/2011 |
| DE | 3131944 | 5/1987 |
| EP | 0882594 | 12/1998 |
| GB | 2312283 | 10/1997 |
| JP | 08015208 | 1/1996 |
| JP | 2002127443 | 5/2002 |
| JP | 2002144598 | 5/2002 |
| JP | 2002-267765 | 9/2002 |
| JP | 2002337361 | 11/2002 |
| JP | 2003136749 | 5/2003 |
| JP | 2004136670 | 5/2004 |
| JP | 2007045016 | 2/2007 |
| JP | 2010208095 | 9/2010 |
| KR | 10-240540 | 1/2000 |

* cited by examiner

COLLAPSIBLE CONTAINER AND SENSOR

CROSS-REFERENCE TO RELATED PATENT APPLICATIONS

The present application is a continuation application claiming priority from co-pending U.S. patent application Ser. No. 15/765,256 filed on Mar. 31, 2018 by Esterberg et al. and entitled COLLAPSIBLE CONTAINER AND SENSOR, which was a 371 patent application of PCT/US2015/065357 filed on Dec. 11, 2015, the full disclosures of which are hereby incorporated by reference.

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
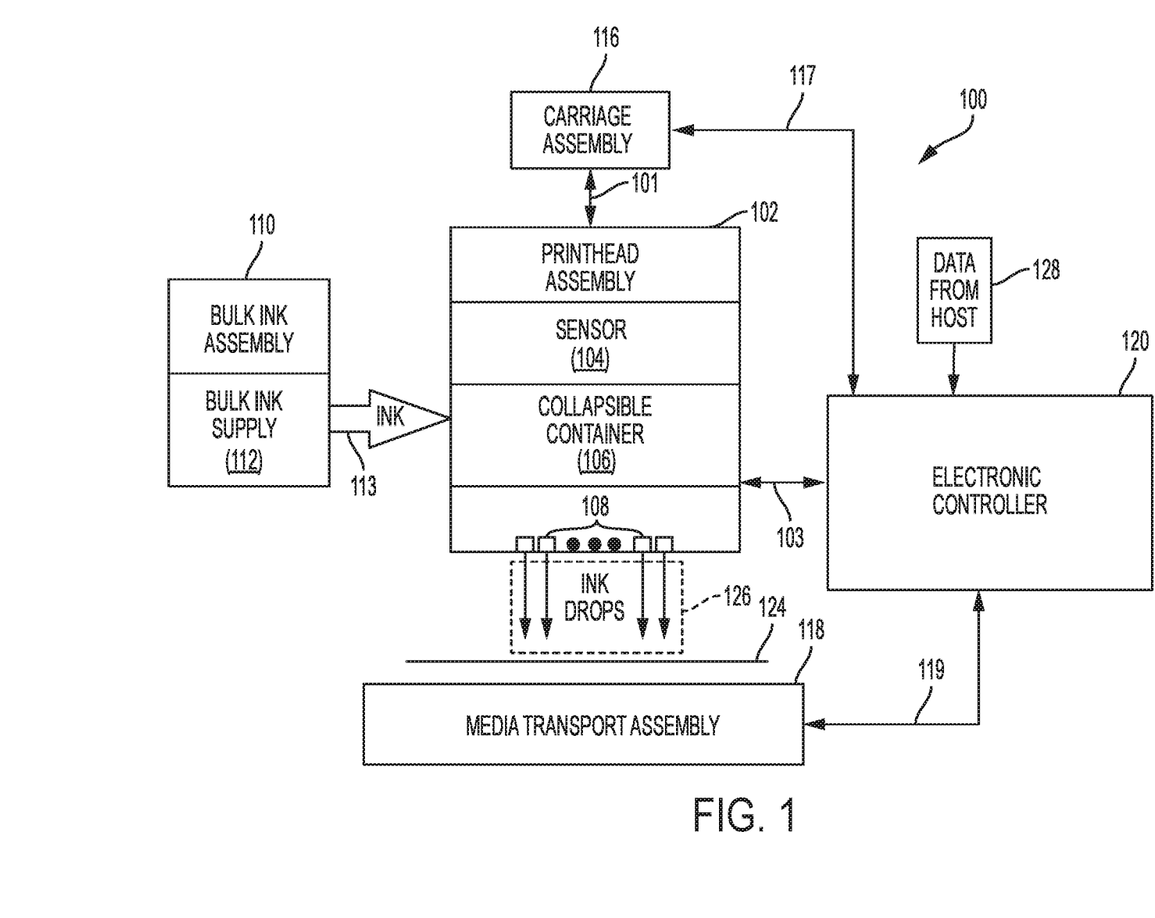
FIG. 1 is a block diagram illustrating one example of an inkjet printing system.

FIG. 1 is a block diagram illustrating one example of an inkjet printing system 100. Inkjet printing system 100 includes a fluid ejection assembly, such as printhead assembly 102, and a fluid supply assembly, such as bulk ink assembly 110. In the illustrated example, inkjet printing system 100 also includes a carriage assembly 116, a print media transport assembly 118, and an electronic controller 120. While the following description provides examples of systems and assemblies for fluid handling with regard to ink, the disclosed systems and assemblies are also applicable to the handling of fluids other than ink, including other liquids and/or toners and 3D powders.

Printhead assembly 102 includes at least one printhead or fluid ejection device which ejects drops of ink or fluid through a plurality of orifices or nozzles 108. In one example, the drops are directed toward a medium, such as print media 124, so as to print onto print media 124. Print medium 124 includes any type of suitable sheet material, such as paper, card stock, transparencies, Mylar, fabric, and the like. In one example, nozzles 108 are arranged in at least one column or array such that properly sequenced ejection of ink from nozzles 108 causes characters, symbols, and/or other graphics or images to be printed upon print media 124 as printhead assembly 102 and print media 124 are moved relative to each other. Printhead assembly 102 also includes a sensor 104 and a collapsible container 106. Collapsible container 106 supplies ink to nozzles 108. Sensor 104 senses the amount of ink within collapsible container 106. In one example, printhead assembly 102 including sensor 104, collapsible container 106, and nozzles 108 are housed together in an inkjet or fluid-jet print cartridge or pen.

Bulk ink assembly 110 supplies ink to collapsible container 106 of printhead assembly 102 and includes a bulk ink supply 112 for storing ink. Bulk ink assembly 110 may be separate from printhead assembly 102. Bulk ink assembly 110 supplies ink to printhead assembly 102 through an interface connection 113, such as a supply tube and/or a valve.

Carriage assembly 116 positions printhead assembly 102 relative to print media transport assembly 118 and print media transport assembly 118 positions print media 124 relative to printhead assembly 102. Thus, a print zone 126 is defined adjacent to nozzles 108 in an area between printhead assembly 102 and print media 124. In one example, printhead assembly 102 is a scanning type printhead assembly such that carriage assembly 116 moves printhead assembly 102 relative to print media transport assembly 118. In another example, printhead assembly 102 is a non-scanning type printhead assembly such that carriage assembly 116 fixes printhead assembly 102 at a prescribed position relative to print media transport assembly 124.

Electronic controller 120 communicates with printhead assembly 102 through a communication path 103, carriage assembly 116 through a communication path 117, and print media transport assembly 118 through a communication path 119. In one example, when printhead assembly 102 is mounted in carriage assembly 116, electronic controller 120 and printhead assembly 102 may communicate via carriage assembly 116 through a communication path 101. Electronic controller 120 may also communicate with bulk ink assembly 110 such that, in one implementation, a new (or used) ink supply may be detected. Electronic controller 120 may also communicate with bulk ink assembly 110 to control the resupply of ink to collapsible container 106 from bulk ink supply 112.

Electronic controller 120 receives data 128 from a host system, such as a computer, and may include memory for temporarily storing data 128. Data 128 may be sent to inkjet printing system 100 along an electronic, infrared, optical or other information transfer path. Data 128 represent, for example, a document and/or file to be printed. As such, data 128 form a print job for inkjet printing system 100 and includes at least one print job command and/or command parameter.

In one example, electronic controller 120 provides control of printhead assembly 102 including timing control for ejection of ink drops from nozzles 108. As such, electronic controller 120 defines a pattern of ejected ink drops which form characters, symbols, and/or other graphics or images on print media 124. Timing control and, therefore, the pattern of ejected ink drops, is determined by the print job commands and/or command parameters. In one example, logic and drive circuitry forming a portion of electronic controller 120 is located on printhead assembly 102. In another example, logic and drive circuitry forming a portion of electronic controller 120 is located off printhead assembly 102.

Electronic controller 120 may also receive the sensor signal from sensor 104 of printhead assembly 102. Electronic controller 120 may regulate the amount of ink within collapsible container 106 and provide an out of ink signal based on the sensor signal. Based on the sensor signal, electronic controller 120 may provide a control signal to bulk ink assembly 110 to selectively transfer ink from bulk ink supply 112 to collapsible container 106 to regulate the amount of ink within collapsible container 106.

When bulk ink supply 112 is effectively empty (i.e., for a given ink extraction process the ink flow rate slows greatly, e.g., less than 20% of the full flow rate), the refill rate of collapsible container 106 will decrease. This decrease in the refill rate of collapsible container 106 may be detected by electronic controller 120 based on the sensor signal. In response to detecting a decrease in the refill rate, electronic controller 120 may generate an out of ink signal indicating bulk ink supply 112 is effectively empty. In response to the out of ink signal, a user of inkjet printing system 100 may be prompted to replace or refill bulk ink supply 112. Printhead assembly 102 may continue printing after the out of ink signal is generated until the sensor signal indicates that collapsible container 106 is also effectively empty.

Figure 2A:
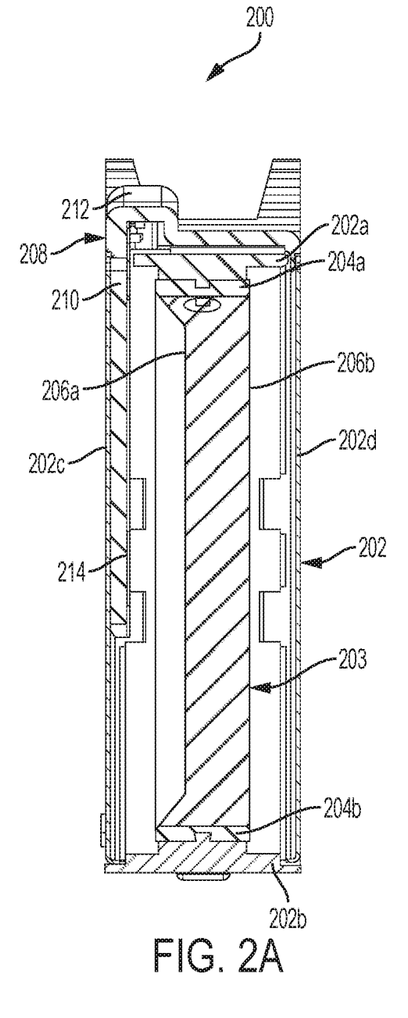
FIGS. 2A and 2B illustrate one example of a printhead assembly.
Figure 2B:
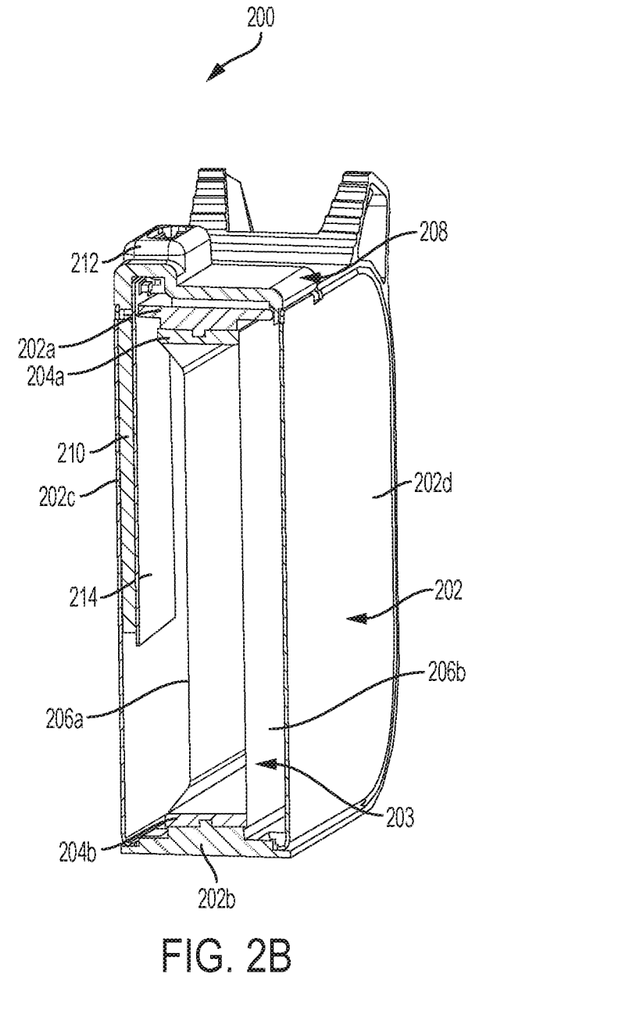

FIGS. 2A and 2B illustrate one example of a printhead assembly 200. Printhead assembly 200 may provide printhead assembly 102 previously described and illustrated with reference to FIG. 1. Printhead assembly 200 includes a housing 202, a collapsible container 203, and a sensor assembly 208. Housing 202 includes a top housing portion 202a, a bottom housing portion 202b, a first housing sidewall portion 202c, and a second housing sidewall portion 202d opposite to the first housing sidewall portion 202c. The top of each housing sidewall portion 202c and 202d is attached to top housing portion 202a. The bottom of each housing sidewall portion 202c and 202d is attached to bottom housing portion 202b.

Collapsible container 203 includes a first flexible sidewall 206a and a second flexible sidewall 206b opposite to first flexible sidewall 206a. The top side of each flexible sidewall 206a and 206b is attached to top housing portion 202a via a connector 204a. The bottom side of each flexible sidewall 206a and 206b is attached to bottom housing portion 202b via a connector 204b. Flexible sidewalls 206a and 206b may comprise biaxially-oriented polyethylene terephthalate (BoPET) or another suitable material. When ink is removed from collapsible container 203, flexible sidewalls 206a and 206b move closer to each other. When ink is added to collapsible container 203, flexible sidewalls 206a and 206b move further apart from each other.

In one example, second flexible sidewall 206b is constrained to limit the movement of second flexible sidewall 206b and first flexible sidewall 206a is not constrained. Second flexible sidewall 206b may be constrained by attaching second flexible sidewall 206b between top housing portion 202a and bottom housing portion 202b tightly such that second flexible sidewall 206b includes little or no excess material between top housing portion 202a and bottom housing portion 202b. First flexible sidewall 206a may be attached between top housing portion 202a and bottom housing portion 202b loosely such that first flexible sidewall 206a includes excess material between top housing portion 202a and bottom housing portion 202b. Accordingly, first flexible sidewall 206a moves to a much greater extent than second flexible sidewall 206b when ink is added and/or removed from collapsible container 203.

Sensor assembly 208 includes a mounting bracket 210, a signal line port 212, and a printed circuit assembly (PCA) 214. In one example, mounting bracket 210 is L-shaped. Mounting bracket 210 is attached to top housing portion 202a outside housing 202 and to first housing sidewall portion 202c inside housing 202. PCA 214 is attached to mounting bracket 210 and faces first flexible sidewall 206a of collapsible container 203. PCA 214 includes a sensor arranged to sense the amount of ink within collapsible container 203. PCA 214 is electrically coupled to signal line port 212 for transmitting the sensor signal to a controller, such as controller 120 previously described and illustrated with reference to FIG. 1.

Figure 3A:
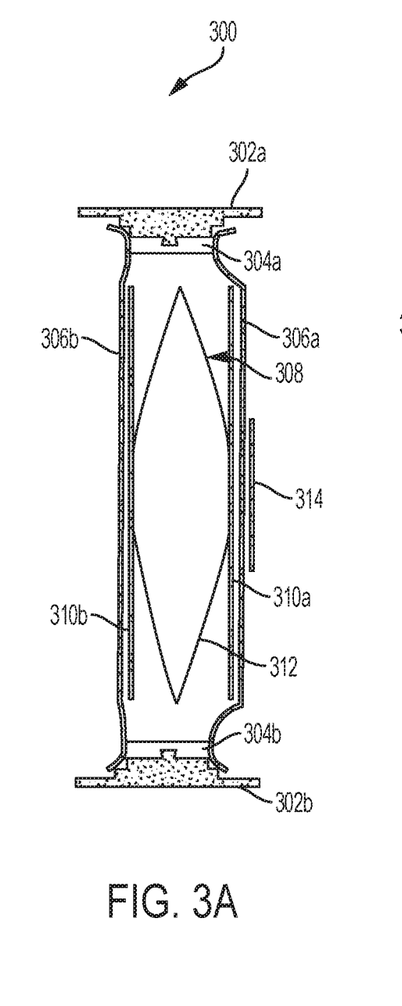
FIG. 3A illustrates one example of a collapsible container in an expanded state and FIG. 3B illustrates one example of the collapsible container in a collapsed state.
Figure 3B:
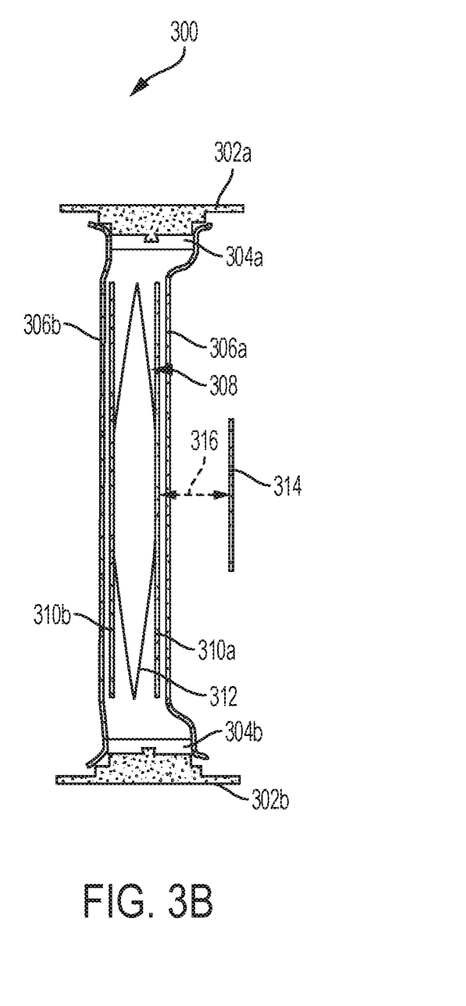

FIG. 3A illustrates one example of a collapsible container 300 in an expanded state and FIG. 3B illustrates one example of collapsible container 300 in a collapsed state. In one example, collapsible container 300 may be part of a printhead assembly and provide collapsible container 203 previously described and illustrated with reference to FIGS. 2A and 2B. In another example, collapsible container 300 may be part of a fluid supply assembly for supplying a fluid to an output port.

In one example, collapsible container 300 is a spring bag. Collapsible container 300 includes a top housing portion 302a, a bottom housing portion 302b, a first flexible sidewall 306a, a second flexible sidewall 306b, and a spring assembly 308 between the first flexible sidewall 306a and the second flexible sidewall 306b. Spring assembly 308 includes a first plate 310a coupled to a second plate 310b via a leaf spring 312.

The top side of each flexible sidewall 306a and 306b is attached to top housing portion 302a via a connector 304a. The bottom side of each flexible sidewall 306a and 306b is attached to bottom housing portion 302b via a connector 304b. Flexible sidewalls 306a and 306b may comprise biaxially-oriented polyethylene terephthalate (BoPET) or another suitable material. Spring assembly 308 exerts constant pressure against flexible sidewalls 306a and 306b to expand. When ink is removed from collapsible container 300, flexible sidewalls 306a and 306b squeeze together as illustrated in FIG. 3B. When ink is added to collapsible container 300, flexible sidewalls 306a and 306b move further apart as illustrated in FIG. 3A. Spring assembly 308 maintains a sufficient back pressure within collapsible container 300 for proper ejection of ink from the nozzles of the printhead assembly.

In one example, second flexible sidewall 306b is constrained to limit the movement of second flexible sidewall 306b and first flexible sidewall 306a is not constrained. Second flexible sidewall 306b may be constrained by attaching second flexible sidewall 306b between top housing portion 302a and bottom housing portion 302b tightly such that second flexible sidewall 306b includes little or no excess material between top housing portion 302a and bottom housing portion 302b. First flexible sidewall 306a may be attached between top housing portion 302a and bottom housing portion 302b loosely such that first flexible sidewall 306a includes excess material between top housing portion 302a and bottom housing portion 302b. Accordingly, first flexible sidewall 306a moves to a much greater extent than second flexible sidewall 306b when ink is added and/or removed from collapsible container 300.

A sensor 314 attached to a sidewall of the housing (not shown) is arranged to sense the position of first plate 310a of spring assembly 308 relative to sensor 314. Sensor 314 provides a signal indicating the distance 316 (FIG. 3B) between sensor 314 and first plate 310a. In one example, sensor 314 may include a resonant circuit including an inductive coil for sensing the position of first plate 310a relative to sensor 314. In other examples, sensor 314 may include other suitable components for sensing the distance between first plate 310a and sensor 314. The sensor signal may be received by a controller, such as controller 120 previously described and illustrated with reference to FIG. 1, to determine the amount of ink within collapsible container 300, to regulate the amount of ink supplied to collapsible container 300 from a bulk ink supply, and to determine when the bulk ink supply is effectively empty.

Figure 4:
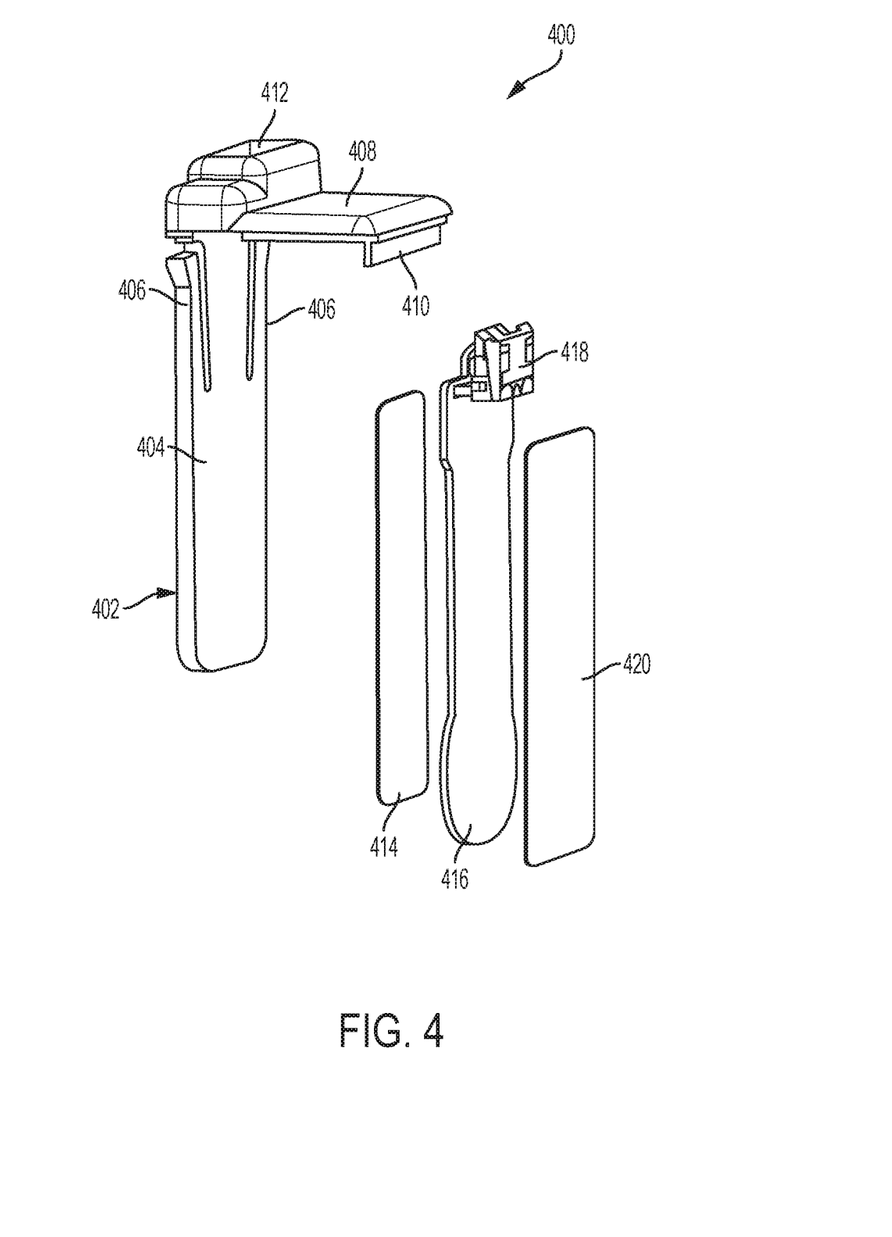
FIG. 4 illustrates an exploded view of one example of a sensor assembly.

FIG. 4 illustrates an exploded view of one example of a sensor assembly 400. In one example, sensor assembly 400 provides sensor assembly 208 previously described and illustrated with reference to FIGS. 2A and 2B. Sensor assembly 400 includes a mounting bracket 402, an adhesive material 414, a printed circuit assembly (PCA) 416, and a coverlay material 420.

In one example, mounting bracket 402 is L-shaped and includes a first portion 404 for inserting into a housing and a second portion 408 attached to the first portion 404 at a right angle for covering a top portion of the housing. In one example, sensor assembly 400 is installable and removable from a housing. First portion 404 may include locking tabs 406 to hold mounting bracket 402 within a housing while enabling removal of mounting bracket 402 from the housing by pressing locking tabs 406 toward each other and lifting mounting bracket 402 out of the housing. Second portion 408 may include a tab 410 for aligning and attaching mounting bracket 402 to a housing.

PCA 416 is attached to first portion 404 of mounting bracket 402 via adhesive material 414. Adhesive material 414 may be a double sided pressure sensitive adhesive tape or another suitable adhesive material. PCA 416 includes a sensor (not shown) and a connector 418. Connector 418 is electrically coupled to the sensor of PCA 416 and is accessible through an opening 412 of mounting bracket 408 to provide a signal line port. A coverlay material 420, such as a coverlay tape or another suitable coverlay material, is attached to PCA 416 opposite to adhesive material 414. Coverlay material 420 electrically insulates the surface of PCA 416.

Figure 5:
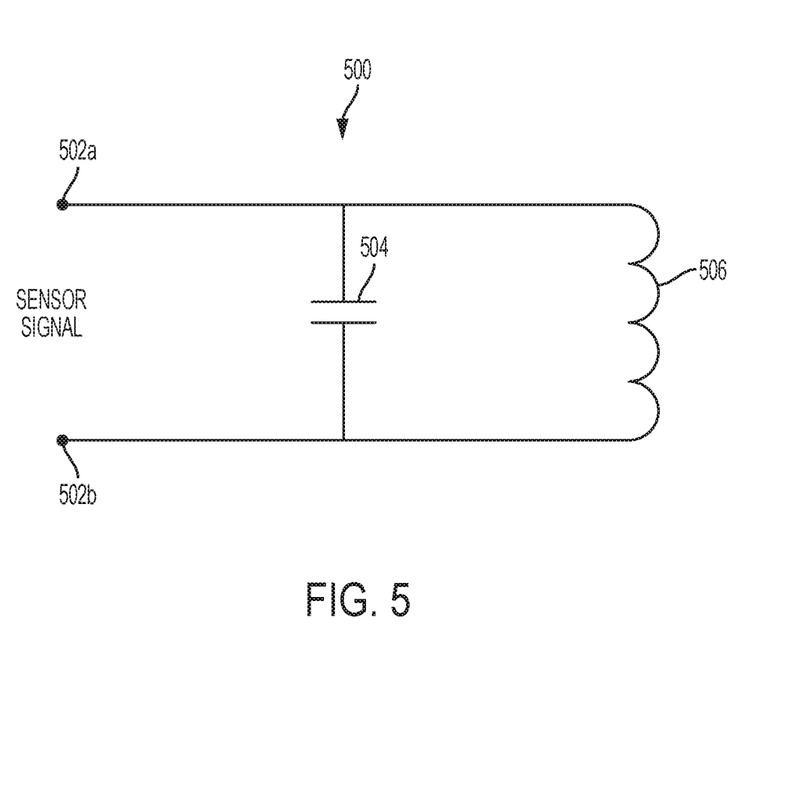
FIG. 5 is a circuit diagram illustrating one example of a sensor.

FIG. 5 is a circuit diagram illustrating one example of a sensor 500. In one example, sensor 500 is part of PCA 416 previously described and illustrated with reference to FIG. 4. Sensor 500 includes a capacitor 504 coupled in parallel with an inductive coil 506 across nodes 502a and 502b to provide a resonant circuit. The signal between nodes 502a and 502b provides the sensor signal. In one example, inductive coil 506 is integrated into a printed circuit board of the PCA. The inductance of inductive coil 506 changes based on the position of sensor 500 relative to a plate of the spring assembly of a collapsible container. Accordingly, sensor 500 may be used to sense the amount of ink or fluid within a collapsible container.

Figure 6:
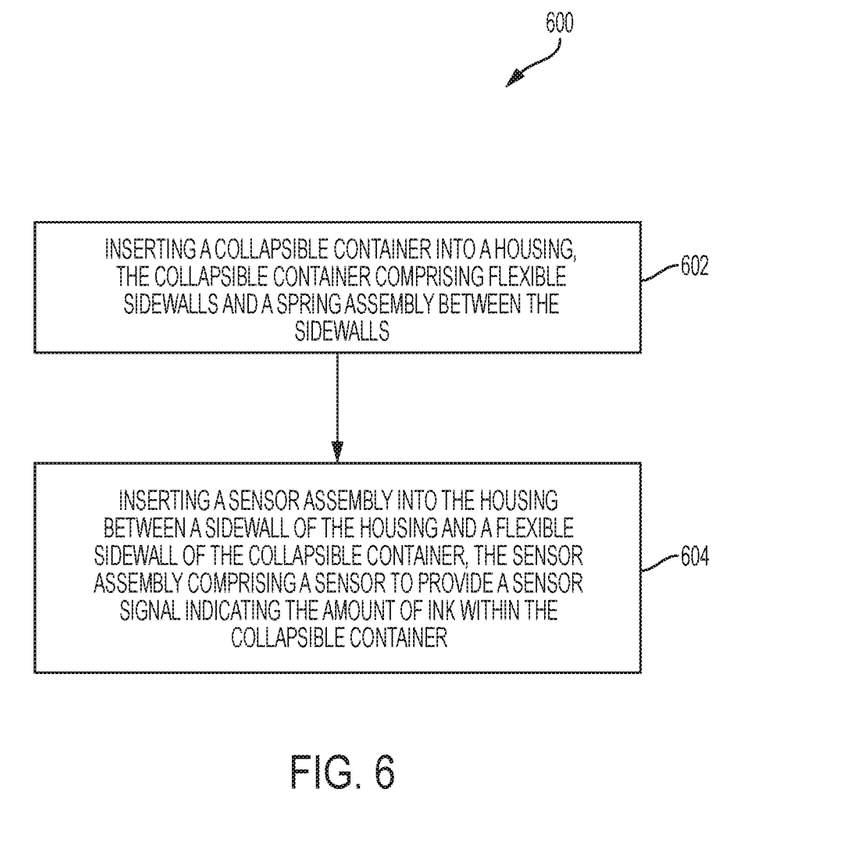
FIG. 6 is a flow diagram illustrating one example of a method for fabricating a printhead assembly.

FIG. 6 is a flow diagram illustrating one example of a method 600 for fabricating a printhead assembly, such as printhead assembly 200 previously described and illustrated with reference to FIGS. 2A and 2B. At 602, method 600 includes inserting a collapsible container into a housing. The collapsible container comprises flexible sidewalls and a spring assembly between the sidewalls. At 604, method 600 includes inserting a sensor assembly into the housing between a sidewall of the housing and a flexible sidewall of the collapsible container. The sensor assembly comprises a sensor to provide a sensor signal indicating the amount of ink within the collapsible container.

In one example, the spring assembly comprises a first plate coupled to a second plate via a leaf spring and the first plate faces the sensor. The sensor senses the distance between the first plate and the sensor. In another example, the collapsible container is fabricated with a first flexible sidewall comprising more material than a second flexible sidewall opposite to the first flexible sidewall such that motion of the first flexible sidewall is less constrained than motion of the second flexible sidewall.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A printhead assembly comprising:
   a housing;
   nozzles to eject ink drops;
   a collapsible container within the housing to supply ink to the nozzles, the collapsible container comprising:
      a top wall;
      a bottom wall;
      a first flexible wall extending from the top wall to the bottom wall;
      a second flexible wall extending from the top wall to the bottom wall opposite the first flexible wall to form an interior; and
      a spring assembly within the interior between the first flexible wall and the second flexible wall, wherein the first flexible wall comprises a first amount of excess material and wherein the second flexible wall comprises a second amount of excess material less than the first flexible wall such that motion of the first flexible wall of the collapsible container is constrained against movement to a lesser extent as compared to the second flexible wall; and
   a sensor assembly coupled to the housing, the sensor assembly comprising a sensor to provide a sensor signal indicating an amount of ink within the collapsible container, wherein the sensor is arranged such that the first flexible wall faces the sensor.

2. The printhead assembly of claim 1, wherein the spring assembly comprises a first plate coupled to a second plate via a leaf spring, the first plate facing the sensor; and
   wherein the sensor senses the distance between the first plate and the sensor.

3. The printhead assembly of claim 1, wherein an inductance of the sensor changes based on the position of the spring assembly.

4. The printhead assembly of claim 1, wherein the sensor comprises a resonant circuit.

5. The printhead assembly of claim 1, wherein motion of the first flexible wall of the collapsible container is not constrained and motion of the second flexible wall of the collapsible container opposite to the first flexible wall is constrained.

6. The printhead assembly of claim 1, wherein the sensor assembly comprises:
   a printed circuit board comprising an integrated inductive coil;
   a capacitor coupled in parallel with the inductive coil; and
   a signal line port electrically coupled to the printed circuit board.

7. The printhead assembly of claim 6, wherein the sensor assembly further comprises:
   an L-shaped mounting bracket coupled to the printed circuit board, the mounting bracket coupled to the housing.

8. The printhead assembly of claim 1, wherein the housing comprises a top wall and a bottom wall, wherein the top wall of the housing is connected to the top wall of the collapsible container and wherein the bottom wall of the housing is connected to the bottom wall of the collapsible container.

9. The printhead assembly of claim 1, wherein the top wall of the housing is connected to the top wall of the collapsible container by tongue and groove connection.

10. The printhead assembly of claim 1, wherein the sensor assembly is coupled to the housing out of contact with space from the collapsible container and when the sensor assembly is to provide the sensor signal indicating the amount of ink within the collapsible container absent any contact between the sensor assembly and the collapsible container.

11. The printed assembly of claim 1, wherein the interior is defined independent of the housing.

12. A collapsible container for insertion into a housing of a fluid supply assembly having a sensor, the collapsible container comprising:
   a top wall;
   a bottom wall;
   a first flexible wall extending from the top wall to the bottom wall;
   a second flexible wall extending from the top wall to the bottom wall opposite the first flexible wall to form an interior; and
   a spring assembly within the interior between the first flexible wall and the second flexible wall, wherein the first flexible wall comprises a first amount of excess material and wherein the second flexible wall comprises a second amount of excess material less than the first flexible wall such that motion of the first flexible wall of the collapsible container is constrained against movement to a lesser extent as compared to the second flexible wall.

13. The collapsible container of claim 12, wherein the spring assembly comprises a first plate coupled to a second plate via a leaf spring, the first plate to face the sensor to facilitate sensing of a distance between the first plate and the sensor of the housing.

14. The collapsible container of claim 12, wherein the top wall of the collapsible container comprises one of a tongue and a groove for connection to the other of the tongue and the groove of the housing.

15. The collapsible container of claim 14, wherein the bottom wall of the collapsible container comprises a second one of a tongue and a groove for connection to the second other of the tongue and the groove of the housing.

16. The collapsible container of claim 12, wherein the interior is defined independent of the housing.

17. A method for fabricating a printhead assembly, the method comprising:
   inserting a collapsible container into a housing, the collapsible container comprising flexible walls and a spring assembly between the walls; and
   inserting a sensor assembly into the housing between a wall of the housing and a flexible wall of the collapsible container, the sensor assembly comprising a sensor to provide a sensor signal indicating an amount of ink within the collapsible container, wherein the collapsible container is fabricated with a first flexible wall comprising more material than a second flexible wall opposite to the first flexible wall such that motion of the first flexible wall is less constrained than motion of the second flexible wall.

18. The method of claim 17, wherein the spring assembly comprises a first plate coupled to a second plate via a leaf spring, the first plate facing the sensor; and
   wherein the sensor senses the distance between the first plate and the sensor.

19. The method of claim 17, wherein the collapsible container forms an interior independent of the housing.

20. The method of claim 17 further comprising retaining the collapse of container within the housing using a tongue and groove connection.

* * * * *